United States Patent [19]

Nickerson, Jr.

[11] Patent Number: 4,470,703
[45] Date of Patent: Sep. 11, 1984

[54] PROCESS FOR MIXING AND RETARDING CURE OF CEMENT

[76] Inventor: Bryan W. Nickerson, Jr., 200 Lore Ave., Wilmington, Del. 19809

[21] Appl. No.: 425,931

[22] Filed: Sep. 28, 1982

[51] Int. Cl.³ ............................................. G28C 3/00
[52] U.S. Cl. ..................................................... 366/3
[58] Field of Search ........................ 53/431, 434, 474; 206/219, 220; 220/360, 361, 362, 363, 367; 366/1, 2, 3, 6, 10, 12, 53, 54, 55, 69, 130, 219, 220, 237, 239, 348, 349; 426/396, 410, 412

[56] References Cited

U.S. PATENT DOCUMENTS

| | | | |
|---|---|---|---|
| 3,804,379 | 4/1974 | Merz | 366/220 X |
| 3,860,219 | 1/1975 | Nickerson, Jr. | 206/219 X |
| 4,122,197 | 10/1978 | Krugmann | 426/396 X |

Primary Examiner—Robert W. Jenkins
Assistant Examiner—Arthur D. Dahlberg

[57] ABSTRACT

The present invention is a process that provides a means for mixing a small batch of cement within a plastic bag and storing it over an extended period of time by creating an environment within the bag comprising a series of steps that coact in their manner of mixing, venting and sealing of the plastic bag that cause the cure of the cement mixture to be retarded.

1 Claim, 4 Drawing Figures

PROCESS FOR MIXING AND RETARDING CURE OF CEMENT

This invention relates to the mixing and storing of cement such as used in concrete and the like, and more particulary to storing wet cement over an extended period of time by retarding the cure thereof without the need for additional water or agitation.

In my earlier invention, U.S. Pat. No. 3,860,219, I disclosed a means by which a homeowner, for example, could mix a small batch of cement within a plastic bag. The idea then was to mix the cement at the job site and pour it into the job before the cement had a chance to set-up. It is generally known that unless some action is taken to retard the cure, the cement begins to dry out immediately. Cement trucks, for example, constantly agitate and mix the cement to maintain workability.

Therefore it is the general object of the present invention to provide a series of steps whereby a small batch of cement can be mixed with water within a plastic bag at one location, then stored and possibly shipped over a relatively longer distance and period of time without the need for additional agitation or water to retard cure.

The term cure as used herein shall be taken to mean the drying out, setting-up or hardening of a wet cement mixture.

The term plastic bag shall refer to any pliable bag of a watertight nature that will lend itself to ballooning by air.

The term environment as used herein shall mean the space within the plastic bag occupied by air.

The term water shall include any liquid used to mix cement.

The term cement shall be taken to mean any dry mixture of limestone and clay or some similar material used to make mortar, concrete or the like. It may also include gravel or sand aggregate.

The term r/h factor as used herein means the relative humidity or amount of water or moisture in a given amount of air.

It should be remembered that this present disclosure utilizes the process as taught in my earlier invention (U.S. Pat. No. 3,860,219). Therefore details of that process will not be repeated here.

Referring now to the drawing.

Figures 1, 2:
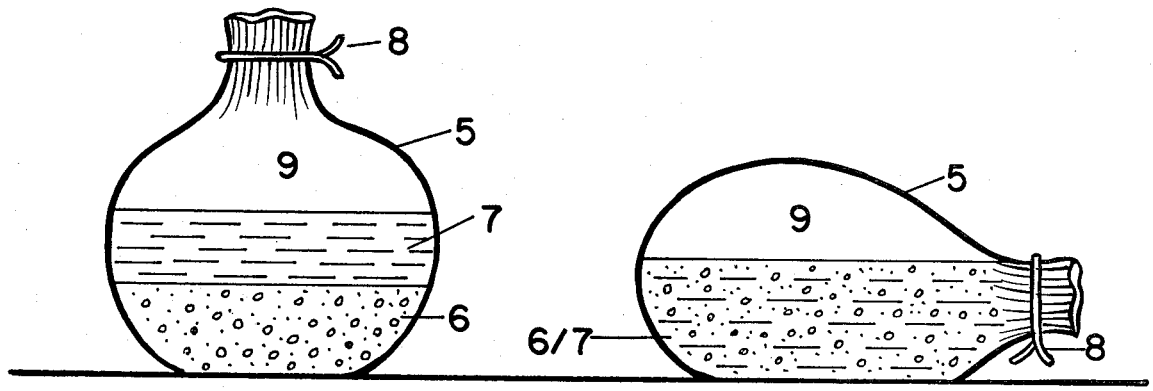
FIG. 1 shows a view of a plastic bag in which there have been placed cement and water (separately) and the bag sealed near the top thereby trapping air in a manner that will cause the bag to balloon and form an elipsoid.
FIG. 2 shows the plastic bag on its side being rolled about an axis thereby mixing the cement and water.

Referring again to the drawing, FIG. 1 shows a plastic bag 5 in which have been placed cement 6 and water 7. The bag is then sealed by any appropriate means; said seal designated by the numeral 8. The manner of closing and sealing the bag may be characterized as gathering the bag high near its opening and trapping air below said gathering, said air identified as 9. The seal 8 is then attached as shown. Consequently, steps have been taken whereby the trapped air causes the bag 5 to balloon to form an elipsoid.

FIG. 2 shows the bag and its contents being rolled (manually) whereby the cement 6 and water 7 are mixed together. It can be seen from this view that the air 9 continues to give the bag a ballooning effect whereby it will readily lend itself to rolling. One departure here over my disclosure in U.S. Pat. No. 3,860,219 is that the rolling is extended in time until at least a portion of the inside of the bag is coated with a film of water and cement. It has been found that this indicates the absorbtion of some of the water into the environment within.

Figures 3, 4:
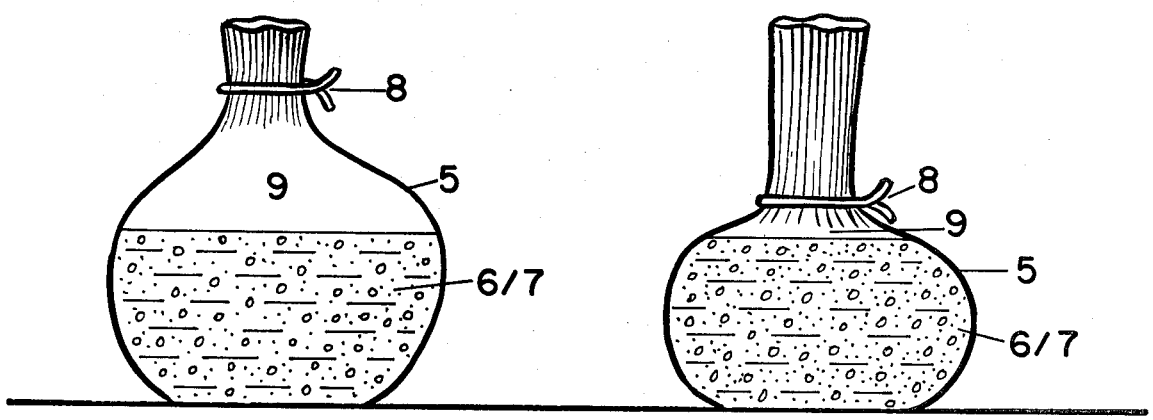
FIG. 3 is a view of the bag standing upright again and showing the cement and water as a mixture.
FIG. 4 shows the plastic bag in a similar condition except the the excess air has been vented and the bag resealed at a different location.

FIG. 3 shows the bag in an upright position after the mixing has been completed. The cement 6 and the water 7 are now combined to form a mixture 6/7, and the air is again found at the top of the bag. The air 9 has been changed by the mixing process however. Specifically, the r/h factor of the air has been increased thereby creating an environment within the bag that has less ability to absorb water or moisture. But not sufficiently, at this point in the process, to retard cure to a feasible degree. Although the stage has been set, i.e., the environment within has been partly conditioned to retard cure, additional steps are needed to give the desired result. The obvious answer would be to add water either then or at a later time and reagitate the mixture to retard, but the whole idea here is to provide a means of departure by mixing, storing and shipping wet cement that will arrive pourable without the need of bothersome reworking.

Since wet cement is unique by nature, it will not lend itself to present means of packaging and preservation. Other means had to be found to keep it workable, i.e., uncured. The solution lies in creating a condition through a series of steps that provide an environment whereby the cement will not dry out or set-up. This is done, as taught herein, by providing a closed, controlled environment within a plastic bag. An environment that is manipulated to bring about the needed condition whereby the water portion of the mixture 6/7 will not, in an acceptable length of time, evaporate into the environment contained and created within the bag and allow the mixture to cure.

To that end, it has been found that the cure time is in direct proportion to the degree at which the water 7 evaporates out of the mixture. Other factors are at work but this is the major cause. In other words, the faster the evaporation, the faster the cure. Although the air, and-/or the environment which are one and the same at this point, has been preconditioned by the mixing to have a high r/h factor, it can still receive more water by reason of its volume. This is true because its ability to receive additional water is based on the combination of its r/h factor and volume. This holds unless the r/h factor is one hundred percent, which, of course, it is not. Therefore a way had to be found to alter the equation of r/h and volume. Since adding water to increase the r/h is impractical, experimentation has shown that reducing the volume of air changes the equation by effecting the remaining environment's ability to absorb moisture. The end result is a satisfactory degree of retardation.

The final stages or steps in this continuing process are the functions of reducing the volume of air thereby reducing the absobtion of moisture, and sustaining that condition by resealing the bag.

Although variations may be used, one embodiment of the step of reducing the volume of air is characterized as venting the bag from the top in the manner of cupping the hands on the outside of the bag around the mass comprising the mixture 6/7 and collapsing the bag immediately above said mass to form a long neck like appearance. The bag is then sealed at the location shown in FIG. 4.

The result is that cement may be mixed at one location in the manner taught, and stored briefly and shipped over a relatively longer distance and period of time without further reworking or need of attention to prevent cure; arriving at the job site workable. This was heretofore impossible in large or small quanities with or without the use of cement trucks and their constant agitation.

Modifications may be resorted to without departing from the scope of the invention.

What is claimed is:

1. In the art of packaging, a process for packaging and storing wet cement wherein the elements of cement and water are combined within a pliable bag also containing air, said air having a variable r/h factor and said bag being adaptable to being rolled about an axis thereby mixing the cement and water, comprising, in combination, the steps of: a means for increasing the r/h factor of said air wherein the water for increasing the r/h factor is derived from a source within the bag; said means characterized as extending the rolling action beyond the initial mixing to a point where the r/h factor is increased as indicated by a film of the mixture of cement and water being formed on the inside of the bag; a means for decreasing the volume of air within said bag; said means characterized as venting a portion of said air from said bag; the steps of increasing the r/h factor and decreasing the volume of air coacting to provide a condition within said bag that will retard the cure time of said mixture; sealing said bag after venting to preserve said condition whereby the mixture can be stored in an uncured state for an extended period of time.

* * * * *